United States Patent
Ishikawa et al.

(10) Patent No.: US 6,554,476 B2
(45) Date of Patent: Apr. 29, 2003

(54) DYNAMIC PRESSURE BEARING DEVICE AND METHOD OF MANUFACTURING THE SAME

(75) Inventors: Masayuki Ishikawa, Nagano (JP); Hiromasa Marumo, Nagano (JP); Hiroshi Zenisawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 14 days.

(21) Appl. No.: 09/797,777

(22) Filed: Mar. 5, 2001

(65) Prior Publication Data
US 2001/0036327 A1 Nov. 1, 2001

(30) Foreign Application Priority Data

Mar. 3, 2000 (JP) ........................................ 2000-058505

(51) Int. Cl.[7] ................................................ F16C 82/06
(52) U.S. Cl. .................... 384/123; 384/107; 29/898.041
(58) Field of Search ................................ 384/121, 123, 384/107, 420; 29/898.02, 898.04, 898.041

(56) References Cited

U.S. PATENT DOCUMENTS

| | | | | |
|---|---|---|---|---|
| 3,615,121 A | * | 10/1971 | Barnett et al. ............... | 384/121 |
| 3,685,875 A | * | 8/1972 | Dee ............................ | 384/121 |
| 4,178,046 A | * | 12/1979 | Silver et al. ................. | 384/121 |
| 4,228,210 A | * | 10/1980 | Scribner .................... | 29/898.07 |
| 5,628,569 A | * | 5/1997 | Hayakawa et al. | |
| 5,653,540 A | * | 8/1997 | Heine et al. ................. | 384/107 |
| 5,658,080 A | * | 8/1997 | Ichiyama .................... | 384/112 |
| 5,770,906 A | * | 6/1998 | Hazelton et al. ............. | 384/121 |
| 5,795,074 A | * | 8/1998 | Rahman et al. ............. | 384/121 |
| 5,803,610 A | * | 9/1998 | Takeuchi .................... | 384/43 |
| 6,020,664 A | * | 2/2000 | Liu et al. ..................... | 384/123 |
| 6,059,459 A | * | 5/2000 | Ichiyama .................... | 384/112 |
| 6,271,612 B1 | * | 8/2001 | Tanaka et al. ............... | 384/107 |
| 6,361,216 B1 | * | 3/2002 | Takahashi et al. .......... | 384/107 |

FOREIGN PATENT DOCUMENTS

| | | | | |
|---|---|---|---|---|
| EP | | 0769629 A | * | 4/1997 |
| JP | | 2001-78388 A | * | 3/2001 |

* cited by examiner

*Primary Examiner*—Jack Lavinder
*Assistant Examiner*—Robert A. Siconolfi
(74) *Attorney, Agent, or Firm*—Sughrue Mion, PLLC

(57) ABSTRACT

In order to manufacture a dynamic pressure bearing device, there are provided a shaft member, and a thrust plate formed with a press-fitting portion into which the shaft member is press-fitted. At least two relief portions are formed in at least one of the press-fitting portion of the thrust plate and a part of the shaft member which corresponds to the press-fitting portion. The shaft member is press-fitted with the press-fitting portion such that the thrust plate extends perpendicular to an axial direction of the shaft member, while making the relief portions absorb press-fitting stress.

8 Claims, 5 Drawing Sheets

DYNAMIC PRESSURE BEARING DEVICE AND METHOD OF MANUFACTURING THE SAME

BACKGROUND OF THE INVENTION

The present invention relates to a dynamic pressure bearing device applicable to apparatus rotating at high speed, for example hard disk drivers, rotary polygon mirror drivers and so forth and methods of manufacturing such a device, and more particularly to a thrust dynamic pressure bearing device and a method of manufacturing the same.

Among apparatus rotating at high speed such as hard disk drivers, there is one using a dynamic pressure bearing so arranged that rotors can rotate without contacting bearing members by causing dynamic pressure to be generated in lubricating oil lying between the rotors and the bearing members while the rotors are rotating upon the respective bearing members. Such a dynamic pressure bearing includes a radial dynamic pressure bearing for supporting the rotor in the direction in which it rotates and a thrust bearing for supporting the rotor in the axial direction.

As for a known thrust bearing, it is formed by press-fitting a disk-like thrust plate into a rotary shaft in order to secure the thrust plate thereto.

The dynamic pressure bearing device will be briefly described by the use of an example of a hard disk driving motor shown in FIG. 6. The structure of the thrust bearing shown in FIG. 6 conforms to what is based on the present invention and though the motor structure is well known, the following description will be given to make clear problems to be solved by the invention.

In FIG. 6, a motor frame 8 has a hole for fixing a sleeve 4 and the lower end portion of the sleeve 4 is securely press-fitted into the hole. The sleeve 4 is a cylindrical member having a central shaft hole, and a small-diameter and a large-diameter recessed portions 13 and 14 are formed round the central shaft hole in the lower end portion of the sleeve 4. The central hole of a stator core 12 is placed in the outer periphery of the sleeve 4 and fixedly bonded thereto or fixed by a proper member. The stator core 12 has a proper number of radially projected poles and a driving coil 23 is wound on each projected pole.

A rotary shaft 1 is inserted into the central hole of the sleeve 4. A disk-like thrust plate 5 has been secured to the lower end portion of the rotary shaft 1 by press-fitting. The thrust plate 5 is disposed in the small-diameter recessed portion 13 of the sleeve 4. A counter plate 6 forming a fixed-side dynamic pressure bearing part is fixedly fitted in the large-diameter recessed portion 14 so as to positioned the thrust plate 5 in the small-diameter recessed portion 13.

Herringbone dynamic pressure grooves are formed on upper and lower surfaces 51 and 52 of the thrust plate 5 in the circumferential direction. There are very small gaps respectively between the upper surface 51 of the thrust plate 5 and the opposed sleeve 4 and between the lower surface 52 of the thrust plate 5 and the opposed counter plate 6. Lubricating fluid such as lubricating oil lies in these gaps, thus forming a dynamic pressure thrust bearing. When the thrust plate 5 together with the rotary shaft 1 rotates, the lubricating fluid is compressed in the dynamic pressure grooves, so that the dynamic pressure is generated in the thrusting direction. Moreover, a very small gap is also present between the outer periphery of the rotary shaft 1 and the central shaft hole of the sleeve 4, dynamic pressure grooves are formed in at least one of the outer peripheral face of the rotary shaft 1 and the inner peripheral face of the central shaft hole of the sleeve 4. Consequently, a radial dynamic pressure bearing part 40 is formed with lubricating fluid lying between the gap above. As the rotary shaft 1 rotates, the lubricating fluid causes dynamic pressure is generated in the radial direction.

The rotary shaft 1 projects from the upper edge face of the sleeve 4, and the central hole of a rotor hub 2 like a cup placed upside down is secured by press-fitting to the projected portion of the rotary shaft 1. The outer peripheral wall of the rotor hub 2 covers the stator core 12, and a cylindrical rotor magnet 7 is secured to the inner periphery of the outer peripheral wall. The central hole of a one or a plurality of hard disks (not shown) is placed with the outer peripheral face of the rotor hub 2 as a guide, and the hard disk(s) is mounted on a flange 21 formed on the outer peripheral face of the rotor hub 2. The hard disk is fitted integrally to the rotor hub 2 with a proper cramp member.

Supply of power to each driving coil 23 is controlled in accordance with the rotational position of the rotor magnet 7, whereby the rotor magnet 7, the rotor hub 1, the rotary shaft 1 and the thrust plate 5, these integrally forming rotating parts, are rotated. With their rotation, the aforementioned thrust and radial dynamic pressures are generated and the rotary shaft 1 makes non-contact rotation relative to the sleeve 4 and the counter plate 6 forming the fixed-side dynamic pressure bearing part. Therefore, the frictional resistance is reduced to make possible the smooth and high-speed rotation of the rotary shaft 1.

With respect to the formation of the thrust dynamic pressure bearing part, the rotary shaft 1 is press-fitted into and integrated with the thrust plate 5, for example. FIG. 7 shows how the rotary shaft 1, the thrust plate 5 and the counter plate 6 are combined together in the related art. As seen from FIG. 6, the right angles at which the rotary shaft 1 meets the thrust plate 5 are important and unless the degree of the right angle is satisfactory as shown in FIG. 8, the gap in the thrust dynamic pressure bearing part would lack uniformity, thus making the generation of the dynamic pressure unstable. The method heretofore used to increase the degree of the right angle is to raise the precision of jigs when the rotary shaft 1 is press-fitted into the thrust plate 5.

The degree of the right angle between the rotary shaft and the thrust plate may be considered to be made accurately achievable by shaving the shaft without press-fitting the rotary shaft into the thrust plate. Under this method, the degree of the right angle can be attained precisely and there is no problem arising from causing the thrust plate from warping. However, the disadvantage of the shaving method includes making the working troublesome, requiring a lengthy working time, wasting much raw material and increasing costs.

These problems will be developed from not only the shaft rotating type but also a shaft fixed type.

SUMMARY OF THE INVENTION

An object of the present invention made to solve the foregoing problems concerning the related art is to provide a dynamic pressure bearing device having a shaft and a thrust plate forming a thrust dynamic pressure bearing part which is mounted to the shaft in a direction perpendicular to the shaft, in such a manner as to integrate the shaft and the thrust plate by press-fitting so that the thrust plate can be set free from warping and the gap between the thrust plate and the fixed-side dynamic pressure bearing part is uniformized, whereby a stable thrust dynamic pressure is obtainable, and to provide a method of manufacturing the same.

In order to achieve the above object, according to the present invention, there is provided a dynamic pressure bearing device, comprising:

a shaft member;

a thrust plate, formed with a press-fitting portion into which the shaft member is press-fitted such that the thrust plate extends perpendicular to an axial direction of the shaft member;

a bearing member, being opposed to the thrust plate for forming a thrust dynamic pressure bearing portion; and at least two relief portions, for absorbing press-fitting stress, the relief portions provided in at least one of the press-fitting portion of the thrust plate and a part of the shaft member which corresponds to the press-fitting portion.

In this configuration, a portion which is equivalent to the press-fitting margin is relieved when the shaft member is press-fitted into the thrust plate. Therefore, the stress axially applied to the thrust plate after it has been press-fitted into the shaft is reduced without causing the thrust plate to warp. Thus, the gap between the thrust plate and the opposed bearing member is uniformized and the shaft member after the generation of the dynamic pressure is determined with stability, so that a highly reliable dynamic pressure bearing device becomes obtainable.

Preferably, the relief portions are formed with equal intervals in a circumferential direction of the shaft member.

In this configuration, the press-fitting margin portion can be relieved with a well balance, which resulting in obtaining a stable dynamic pressure with the warping of the thrust plate effectively reduced.

More preferably, the relief portions are provided as notched grooves which extend entirely in the thrust plate, in parallel with the axial direction of the shaft member.

Preferably, the thrust plate is made of a material which can be subjected to coining process, and dynamic pressure grooves are formed on the thrust plate by the coining process.

Although such a material may be easily deformable, that is, easily warped at the time of press-fitting, the warping of the thrust plate can be efficiently eliminated by forming each relief portion for absorbing the press-fitting stress.

In order to manufacture the dynamic pressure bearing device, there are provided a shaft member, and a thrust plate formed with a press-fitting portion into which the shaft member is press-fitted. At least two relief portions are formed in at least one of the press-fitting portion of the thrust plate and a part of the shaft member which corresponds to the press-fitting portion. The shaft member is press-fitted with the press-fitting portion such that the thrust plate extends perpendicular to an axial direction of the shaft member, while making the relief portions absorb press-fitting stress.

Preferably, the relief portions are formed when the coining process is conducted to form the dynamic pressure grooves on the thrust plate.

In this configuration, the relief portions can be formed without increasing the number of processing steps.

DETAILED DESCRIPTION OF THE PREFERRED EMBODIMENTS

There will be described a dynamic pressure bearing device and a method of manufacturing the same according to one embodiment of the present invention. Incidentally, an example of the hard disk drive to which the dynamic pressure bearing device according to the invention has already been described with reference to FIG. 6. Therefore, the construction of the thrust dynamic pressure bearing as the essential point of the invention and the method of manufacturing the same will be selectively described hereinafter.

Figure 1:
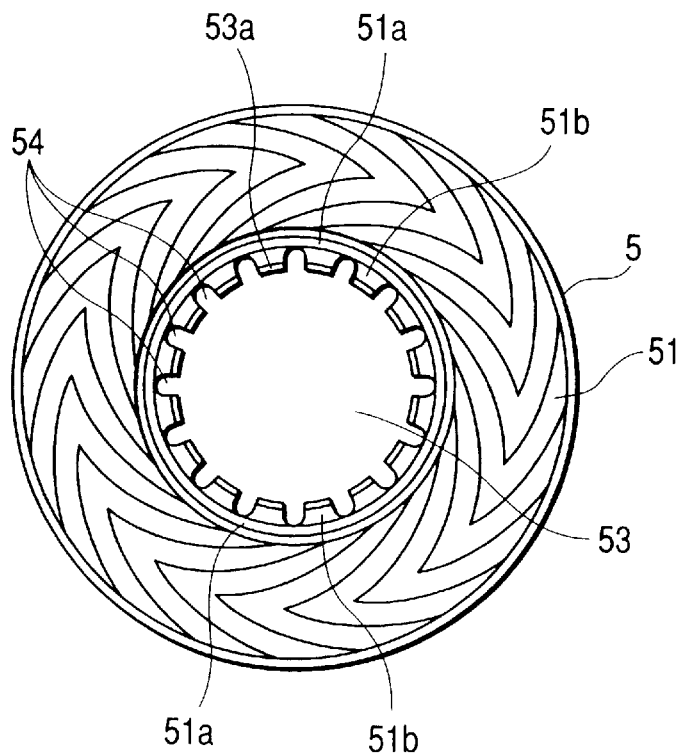
FIG. 1 is a top plan view of a thrust plate according to one embodiment of the present invention.
Figure 2:
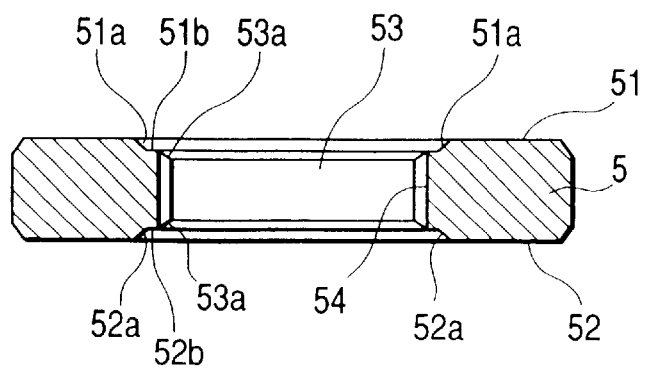
FIG. 2 is an elevational section view of the thrust plate.
Figure 3:
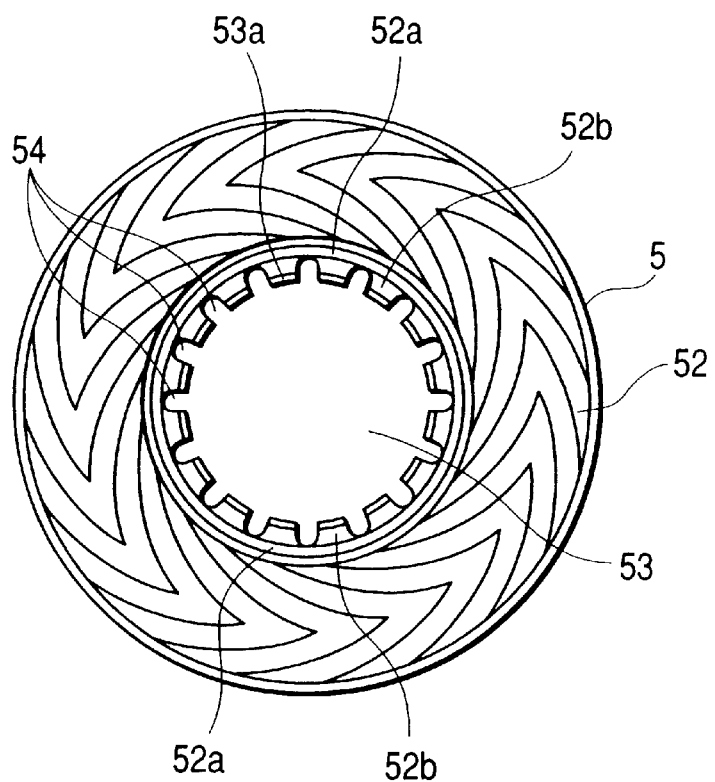
FIG. 3 is a bottom plan view of the thrust plate.

FIGS. 1 to 3 show an example of a thrust plate for use in the invention. As shown in FIGS. 1 to 3, a thrust plate 5 forms a disk in the shape of a ring having a central shaft hole 53. As shown in FIG. 1, herringbone dynamic pressure grooves are formed in such a way as to surround the hole 53 in an upper surface 51 of the thrust plate 5. Similarly, as shown in FIG. 3, herringbone dynamic pressure groove are also formed in such a way as to surround the hole 53 in a lower surface 52 of the thrust plate 5. As described with reference to FIG. 6, a shaft circular in section is press-fitted into the hole 53 of the thrust plate 5.

There are formed tilted faces 51a and 52a and flat faces 51b and 52b in the central portion forming the central shaft hole 53 so that these faces may be set thinner than the surfaces 51 and 52 where the dynamic pressure grooves are formed. A tapered portion 53a is also formed at the inner peripheral end of each of the flat faces 51b and 52b in the central portion of the central shaft hole 53. Moreover, notched grooves 54 are axially formed in such a way as to hang over each of the flat faces 51b and 52b. The notched grooves 54 are axially formed therethrough so that when the rotary shaft is pressed-fitted into the central shaft hole 53, the flat faces 51b and 52b may form the relief portion of the material of the thrust plate 5 corresponding to a press-fitting margin. These many notched grooves are formed at equal peripheral intervals and in parallel to the central axis of the thrust plate 5.

The provision of the notched grooves 54 make the material on the inner peripheral face forming the central shaft hole 53 easily movable when the rotary shaft is press-fitted into the central shaft hole 53 of the thrust plate 5 thus arranged. Consequently, the material of the thrust plate 5 equivalent to the press-fitting margin works and acts as what narrows the notched grooves 54 formed as the relief portions. Therefore, the stress applied to the thrust plate 5 decreases, thus never warping the thrust plate 5.

In order to prevent the upper surface 51 or the lower surface 52 of the thrust plate 5 from being badly affected by the press-fitting, or in order to make the material of the thrust plate 5 move on the flat faces 51b and 52b as the central portion of the central shaft hole 53, the notched grooves 54 may be formed in a section thinner than the surfaces 51 and 52. Conversely, the tilted faces 51a and 52a, and tapered portions 53a would not be necessarily needed in a case where the section where the notched grooves 54 are formed is thinner than the section where the surfaces 51 and 52 are formed.

Figure 6:
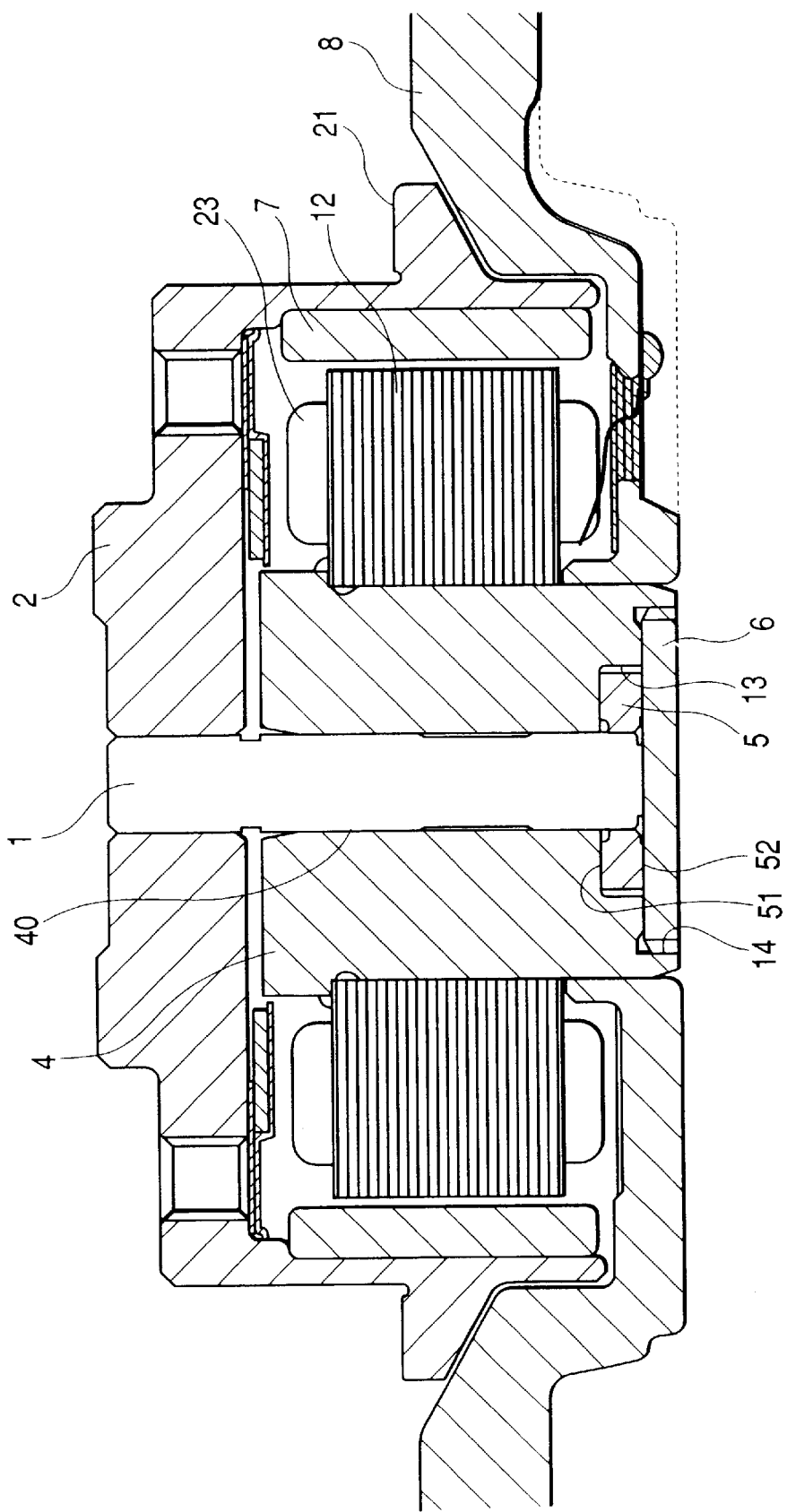
FIG. 6 is a section view of an example of a hard disk driver to which a dynamic pressure bearing device according to the invention is applicable.
Figure 7:
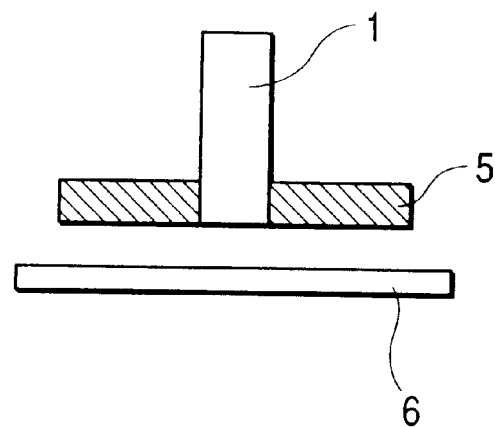
FIG. 7 is a partial elevational section view showing an example of a rotary shaft set for use in a related dynamic pressure bearing device.

The rotary shaft incorporating the thrust plate 5 by press-fitting is as shown in FIG. 6 inserted into the central hole of a sleeve. A gap is formed in the fixed-side dynamic pressure bearing part opposing the upper and lower surfaces of the thrust plate 5; more specifically, it is formed as shown in the example of FIG. 6 between the back surface of the sleeve 4 and the surface of a counter plate 6, so that lubricating fluid existing in the gap causes the fixed-side dynamic pressure bearing part to be generated between the thrust plate 5 and the fixed-side dynamic pressure bearing part. Further, as shown in FIGS. 1 to 3 indicating an exemplified arrangement, the thrust plate 5 is set free from a warp, and the gap between the thrust plate 5 and the fixed-side dynamic pressure bearing part is made uniform. Moreover, a stable dynamic pressure is generated and the position of the rotary shaft is stably determined after the generation of the dynamic pressure, whereby a highly reliable dynamic pressure bearing becomes obtainable.

Figure 8:
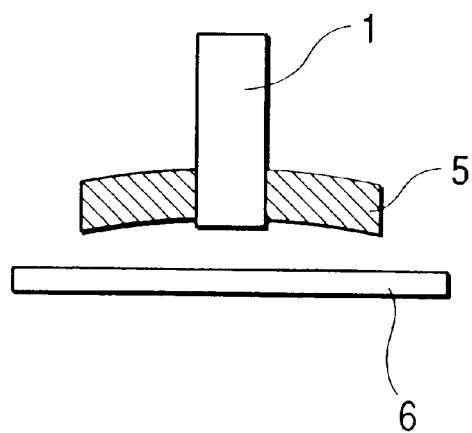
FIG. 8 is a partial elevational section view explanatory of problems concerning the rotary shaft set above.

In the prior-art arrangement, the rotary shaft is circular in horizontal section with the central hole shape of the thrust plate into which the rotary shaft is press-fitted. The rotary shaft is basically circular and by making the outer diameter of the rotary shaft slightly greater than the central hole diameter of the thrust plate, the press-fitting margin is secured. When the thrust plate 5 is press-fitted into the rotary shaft 1, the material of the thrust plate 5 is left over to the extent of the margin. Since there is no place to relief the left over material, the axial internal stress because of the press-fitting is left in the thrust plate 5. While the thrust plate 5 is formed with the dynamic pressure grooves under a method similar to what is used for transferring ruggedness by stamping called a coining method, for example, the thrust plate 5 may warp as shown in FIG. 8 if the internal stress is left over as mentioned above because a deformable material, for example, phosphor bronze is used. Consequently, the gap between the thrust plate 5 and the counter plate 6 becomes ununiformized, thus making the generation of dynamic pressure unstable.

According to the invention, the stress applied to the thrust plate 5 is reduced as stated above and the warping of the thrust plate 5 becomes preventable.

As the stress applied to the thrust plate 5 can be reduced by increasing the press-fitting margin relative to the thrust plate 5 and the rotary shaft so as to increase the strength for preventing the rotary shaft from slipping off the thrust plate 5, it is also possible to eliminate the warping of the thrust plate 5.

Although a number of notched grooves 54 as relief portions are formed in the central shaft hole 53 of the thrust plate 5 in the example shown in FIGS. 1 to 3, such a relief portion may be set at two places at least; that is, at least two relief portions may be formed at equal intervals in the peripheral direction in point symmetry. Thus, the stress at the time of press-fitting is equally absorbed in the peripheral direction, whereby the warping of the thrust plate 5 is effectively reduced.

Figure 4:
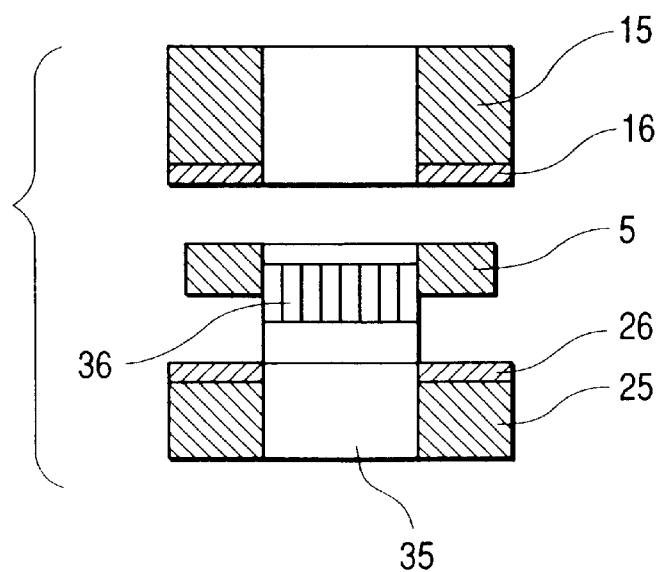
FIG. 4 is an elevational section view showing how to manufacture the thrust plate.

FIG. 4 shows an example of the coining method as one of the methods for forming dynamic pressure grooves in the thrust plate. A mold for implementing the coining method comprises an upper punch 15, a lower punch 25, and a core 35. A super-solid material 16 such as tungsten carbide with a dynamic pressure groove pattern formed on a lower surface of the upper punch 15 is attached thereto, and a carbide material 26 such as tungsten carbide with a dynamic pressure groove pattern formed on an upper surface of the lower punch 25 is also attached thereto. The core is allowed to pass through the central hole of the lower punch 25 and enter the central hole of the upper punch 15. Moreover, knurled unevenness former 36, for example, for forming the relief portions 54 on the peripheral wall of the central shaft hole 53 of the thrust plate 5 is formed on the outer periphery of the upper end portion of the core 35.

The thrust plate 5 is made of a material such as phosphor bronze that can be subjected to coining. The central shaft hole of the thrust plate 5 is tentatively fitted in part of the unevenness former 36 of the core 35 passed through the lower punch 25 between the upper and lower punches 15 and 25. In this state, the upper punch 15 is pressed against the lower punch 25 or the upper and lower punches 15 and 25 are moved in the direction in which both of the punches are set closer to each other, so that the thrust plate 5 is clamped between the upper and lower punches 15 and 25. Simultaneously, the thrust plate 5 is slid along the unevenness former 36 of the core 35. Then the dynamic pressure groove patterns of the carbide materials 16 and 26 of the respective upper and lower punches 15 and 25 are transferred onto the upper and lower faces of the thrust plate 5 and used to form the dynamic pressure grooves. Further, the relief portions 54 are formed on the peripheral wall of the central shaft hole 53 of the thrust plate 5.

Figure 5:
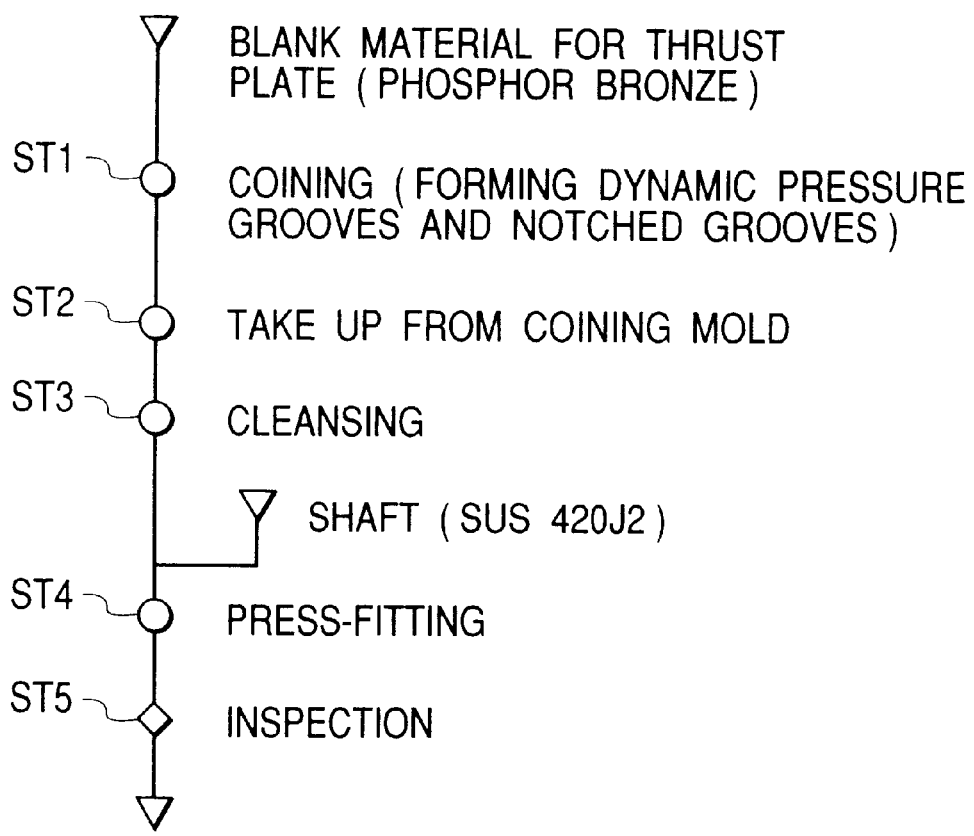
FIG. 5 is a diagram showing steps of fabricating a rotary shaft set comprising a thrust plate and a rotary shaft.

FIG. 5 shows an example of a process for manufacturing thrust plates including the step of coining. The blank material of the thrust plate that can be subjected to coining such as copper materials, for example, phosphor bronze, tempered stainless steel and any other material can be subjected to coining to form the dynamic pressure grooves in both the upper and lower faces of the blank material. At the same time, the notched grooves or knurled relief portions are formed in the inner peripheral face of the blank material so as to obtain the thrust plate (step ST1). Then thrust plate is taken out of the coining processor (step ST2) and cleansed (step ST3). A shaft made of a material such as SUS 420J2 is then press-fitted into the central shaft hole of the thrust plate (step ST4) and subjected to inspection to obtain a complete rotary shaft including the thrust plate integral with the shaft (step ST5). The complete rotary shaft is usable for a hard disk driving motor as shown in FIG. 6.

As set forth above, in this embodiment, though the notched grooves for absorbing the axial stress at the time of press-fitting the thrust plate into the press-fitting portion are formed in the thrust plate, the relief portions may be formed on the thrust plate press-fitting portion on the rotary shaft side, and the circular center of the thrust plate may also be press-fitted into the press-fitting portion of the rotary shaft.

The invention is similarly applicable to a fixed shaft type with a fixed shaft, that is, a bearing motor of a fixed shaft type in which the bearing is rotated relative to the fixed shaft.

Further, the central hole of the thrust plate may be polygonal and a shaft circular in transverse section may be press-fitted to form relief portions in the space produced in the corner portions of the polygonal central hole.

Further, the thrust plate may be formed of a thermoplastic resin and the dynamic pressure grooves and the relief portions may also be formed during the forming step.

What is claimed is:

1. A dynamic pressure bearing device, comprising:

a shaft member;

a thrust plate, formed with a press-fitting portion into which the shaft member is press-fitted such that the thrust plate extends perpendicular to an axial direction of the shaft member;

a bearing member, being opposed to the thrust plate for forming a thrust dynamic pressure bearing portion; and at least two relief portions, for absorbing press-fitting stress directed to the shaft member, the relief portions provided in the press-fitting portion of the thrust plate;

wherein a central portion of the thrust plate is thinned to define a space which allows deformation of the press-fitting portion in a thickness direction of the thrust plate when the press-fitting of the shaft member is performed.

2. The bearing device as set forth in claim 1, wherein the relief portions are formed with equal intervals in a circumferential direction of the shaft member; and wherein the relief portions are provided as notched grooves which extend entirely in the thrust plate, in parallel with the axial direction of the shaft member.

3. The bearing device as set forth in claim 1, wherein the thrust plate is made of a material which can be subjected to coining process, and dynamic pressure grooves are formed on the thrust plate by the coining process.

4. The bearing device as set forth in claim 1, wherein the shaft member is either a rotary shaft in a rotary shaft type bearing device or a fixed shaft in a fixed shaft type bearing device.

5. A method of manufacturing a dynamic pressure bearing device, comprising the steps of:

providing a shaft member;

providing a thrust plate;

thinning a center portion of the thrust plate to form press-fitting portion into which the shaft member is press-fitted;

forming at least two relief portions in at least one of the press-fitting portion of the thrust plate and a part of the shaft member which corresponds to the press-fitting portion; and press-fitting the shaft member with the press-fitting portion such that the thrust plate extends perpendicular to an axial direction of the shaft member, while making the relief portions absorb press-fitting stress, and making a space defined by the thinning step allow deformation of the press-fitting portion in a thickness direction of the thrust plate.

6. The manufacturing method as set forth in claim 5, further comprising the step of forming dynamic pressure grooves on the thrust plate by coining process, wherein the relief portions are formed when the coining process is conducted.

7. The manufacturing method as set forth in claim 5, wherein the relief portions are formed with equal intervals in a circumferential direction of the shaft member.

8. The manufacturing method as set forth in claim 6, wherein the thrust plate is provided as a member made of a copper-family material.

* * * * *